United States Patent
Langsenkamp et al.

(10) Patent No.: US 6,678,358 B2
(45) Date of Patent: Jan. 13, 2004

(54) AUTOMATED NODAL CALLING SYSTEM

(75) Inventors: Al Langsenkamp, Colebrook, NH (US); Kent E. Kercheval, Sheridan, IN (US)

(73) Assignee: Sigma Communications, Inc., Indianapolis, IN (US)

( * ) Notice: Subject to any disclaimer, the term of this patent is extended or adjusted under 35 U.S.C. 154(b) by 115 days.

(21) Appl. No.: 09/845,236

(22) Filed: Apr. 30, 2001

(65) Prior Publication Data

US 2002/0159570 A1 Oct. 31, 2002

(51) Int. Cl.$^7$ ............................................... H04M 1/64
(52) U.S. Cl. ..................... 379/69; 379/88.23; 379/33; 379/45; 379/48
(58) Field of Search ............................... 379/69, 88.23, 379/40, 37, 41, 42, 51, 33, 45, 48, 220.01, 221.01, 221.02, 221.03, 221.04

(56) References Cited

U.S. PATENT DOCUMENTS

| | | | |
|---|---|---|---|
| 5,546,455 A | * 8/1996 | Joyce et al. | 379/265.03 |
| 5,559,867 A | 9/1996 | Langsenkamp et al. | |
| 5,912,947 A | 6/1999 | Langsenkamp et al. | |
| 5,978,460 A | * 11/1999 | Butts et al. | 379/145 |
| 6,002,748 A | * 12/1999 | Leichner | 379/48 |
| 6,009,149 A | * 12/1999 | Langsenkamp | 379/69 |
| 6,067,457 A | * 5/2000 | Erickson et al. | 455/512 |
| 6,445,784 B2 | * 9/2002 | Uppaluru et al. | 379/220.01 |

* cited by examiner

Primary Examiner—Fan Tsang
Assistant Examiner—Ming Chow
(74) Attorney, Agent, or Firm—Russell E. Fowler, II; Doreen J. Gridley; Ice Miller (57) ABSTRACT

An automated nodal calling system comprises a database having a plurality of phone numbers and associated geographic identifiers. In the event of an emergency, an emergency calling area is defined and a message is recorded for delivery to the callees in the emergency calling area. The system generates a call request for all phone numbers having an associated geographic identifiers within the emergency calling area. Each call request contains various pieces of information important to proper completion of the phone call identified in the call request. All of the call requests are stored in a queue and the system determines whether to process each call request from a local node or a remote node. A call request to be processed from a local node is delivered to a template program which connects to the telecommunications system and completes the call request to the identified phone number. After the local node completes the call request, a call response is generated to identify the result of the call request. A call request to be processed from a remote node is delivered to the remote node using a network connection. After the remote node processes the call request, the remote node sends a call response back to the local node using the network connection. In this fashion, the system is capable of efficiently contacting all callees with an emergency message by utilizing both local nodes and remote nodes to place the calls to the callees.

8 Claims, 4 Drawing Sheets

AUTOMATED NODAL CALLING SYSTEM

BACKGROUND

Municipalities generally provide emergency services for their citizens in the event of local emergencies, including fire, flood, and inclement weather. Such services include police protection, fire protection, and emergency warning systems. Unfortunately, emergency situations often call for resources above and beyond those owned by the city encountering the emergency situation. Thus, municipalities often enter into agreements with neighboring communities to provide mutual assistance in the event of emergency situations requiring resources beyond the ability of one city to provide. These mutual assistance agreements typically state that the first city will share its emergency resources with the second city if the second city encounters an emergency situation which requires resources beyond those owned by the second city, and vice-versa.

One emergency warning device used by many municipalities today is the automated calling system. Automated calling systems automatically place telephone calls to city residents and warn them in the event of an emergency. For example, if a hazardous spill occurs within a city, the automated calling system may be used to warn residents of the hazardous spill. One automated calling system is described in U.S. Pat. No. 6,009,149, which is incorporated herein by reference. As described in U.S. Pat. No. 6,009,149, the automated calling system includes a database comprising phone numbers and one or more data fields associated with each phone number. The system selects certain phone numbers to be called based upon the data fields associated with the phone numbers. As each phone number is called, a recorded voice message is played to the individual receiving the call. The recorded voice message may be, for example, an emergency message warning the individual of an approaching storm, such as a tornado or hurricane.

A problem exists with these prior art automated calling systems because they are limited in capacity (i.e., the number of calls that may be placed per unit of time). Each system has only a certain number of lines that may be used to make calls. In addition, each call takes at least a minimum amount of time to complete because the call must be placed, answered by the callee (i.e., the person answering the phone), and the recorded warning message must be played. If there is a rapid response emergency (i.e., an emergency where a large number of individuals need to be contacted in a short amount of time), the system may not have the capacity to warn all individuals within the short warning time. For example, a large number of people in a particular area may need to be warned of the existence of a tornado within minutes after the tornado is spotted. If 500 homes need to be warned within a five minute time frame, and the system only has the capacity to warn 50 homes per minute, the system cannot possibly warn all 500 homes within the allotted 5 minute period. In these situations, it would be helpful to enlist the services of other nearby automated calling systems to help in placing the warning calls to homes at risk. To this end, a first automated calling system could place 250 calls in the five minute period, and a second automated system could place an additional 250 calls, thereby allowing all homes at risk to receive warning of the incoming storm. Such actions would be consistent with the mutual assistance agreements discussed previously. Unfortunately, there has previously been no mechanism in place to allow the automated calling systems of differing communities to combine their systems to reach more homes in a faster time in the event of an emergency.

For the foregoing reasons there is a need for a nodal automated calling system that may be shared between neighboring communities, pursuant to mutual assistance agreements. Such an automated calling system would be operable to enlisted the help of neighboring automated calling systems to efficiently distribute emergency messages to those individuals needing to receive the emergency message in a timely fashion.

SUMMARY

The present invention is directed to a system that satisfies the need for an automated nodal calling system that may be used in conjunction with neighboring automated calling systems to efficiently distribute emergency messages to selected callees. The automated nodal calling system comprises a database having a plurality of phone numbers. Each of the plurality of phone numbers is associated with a data field containing information representing a particular geographic location. When calls are to be placed to callees using the automated nodal calling system, an operator records an audio message to be transmitted over the phone lines. The audio message is stored in a memory and delivered to each callee when a connection is established with the callee. To determine which callees will be contacted, a mapping device is used to define a calling area. Once the calling area is defined, a subset of phone numbers is selected from the database, each phone number having information in a data field representing a geographic location within the calling area. A number of call requests are then generated based on the selected subset of phone numbers. Each call request contains various pieces of information, including one of the phone numbers from the subset of phone numbers and the location of the audio file to be played to the callee. Other information important to proper completion of the phone call is included in each call request. All of the call requests are stored in a temporary file or "queue."

The system is designed to process the call requests from a local node or a remote node. The local node is the system node where the call request was first generated based on the defined calling area. The remote node is a distant node that receives the call request from the local node when the local node desires assistance from the remote node in completing the call request. The remote node generally contains the same or very similar features and functions as the remote node. Thus, the remote node may act as the local node for a different call request, and the local node may act as the remote node.

After a calling area is defined, an audio message is stored, and call requests are generated, the system may begin to process the call requests. After call requests are stored in the queue of the local node, a first call request is pulled from the queue and delivered to a local serving program. The local serving program determines whether to process the first call request from the local node or the remote node.

If the local serving program determines to process the first call request from the local node, the first call request is sent to a local template program. The local template program communicates with a telecommunications interface to access a phone line and initiate a phone call to the telephone number contained in the first call request. Once the phone call is placed, the template program generates a first call response based upon the result of the call and the response from the callee. The local template program sends the first call response to a local gate program. The local gate program generates a statement to update the first call request in the local temporary file or remove the first call request from the local temporary file. A statement instructing the temporary file to update the first call request is delivered directly to the local temporary file and executed against the local temporary file by the local gate program. A statement instructing the temporary file to remove the first call request from the temporary file is sent to a second temporary file. The local server program then removes the statement from the second temporary file and executes the statement against the local temporary file.

On the other hand, if the local serving program determines that the first call request should be processed by the remote node, the serving program communicates with a network interface to send the first call request to a remote node using a wide area network, such as the Internet. The remote node receives the first call request at a remote gate program, which operates similar to the local node gate program. Once the remote node gate program receives the first call request, the remote gate program generates a statement instructing the remote queue to insert the first call request into the remote queue. This statement is then sent to a second remote temporary file. A remote server file then receives this statement from the second remote temporary file and executes the statement against the remote queue. Of course, the phone number in the first call request will only be found in the database of the local node that sent the first call request to the remote node, and will not be found in the remote node's database. Nevertheless, because all information required to initiate and complete a call to a particular phone number is included in the call request, the remote node may process the call request once the call request is stored in the remote queue. The method of processing the first call request in the remote queue is similar to that described above for processing the first call request in the local node. After a remote template program completes the call, a first call response is generated and delivered to the remote gate program. The remote gate program then generates a statement to remove the first call response from the remote queue. In addition, the remote gate program generates a statement for delivery to the local node, instructing the local node to update the first call request in the first temporary file or remove the first call request in the first temporary file.

The term "first call request" is used herein as an example of one of many call requests which may be processed by the system. Of course, many other call requests may be simultaneously or subsequently processed by the system according to the same process and method used for the first call request. Furthermore, the above-described features, aspects and advantages of the present invention will become better understood with reference to the following description and the appended claims.

DESCRIPTION

Figure 1:
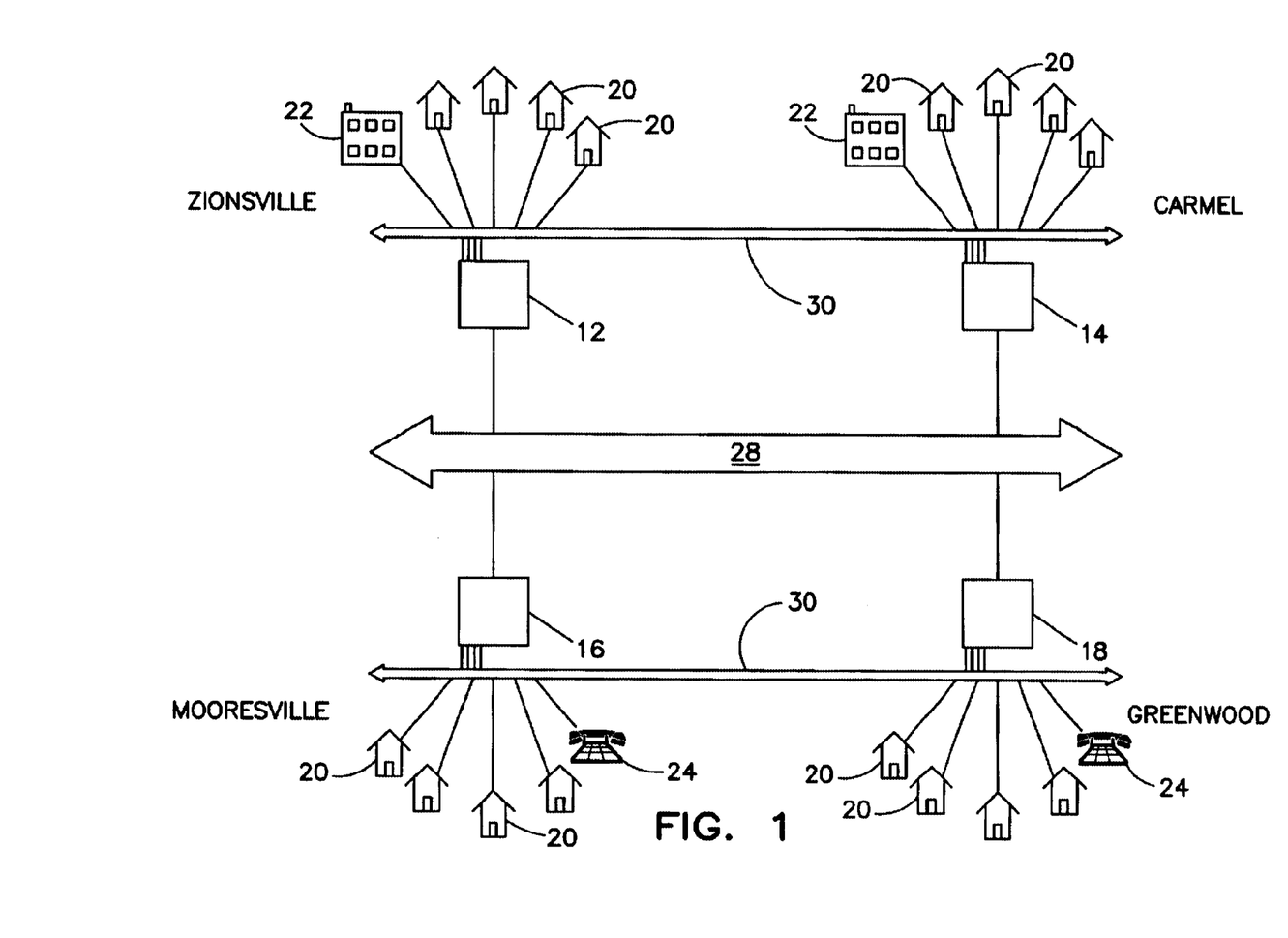
FIG. 1 shows an overview of the connections between nodes in an automated nodal calling system.

As shown in FIG. 1, an automated nodal calling system comprises a plurality of different automated calling systems 12, 14, 16, and 18 located in different cities. In the exemplary system of FIG. 1, automated calling system 12 is located in the city of Zionsville, automated calling system 14 is located in the city of Carmel, automated calling system 16 is located in the city of Mooresville, and automated calling system 18 is located in the city of Greenwood. Each automated calling system is capable of placing calls to callees at remote or local residences 20, businesses 22, or other locations having telephone service 24 using telecommunications system 30. In addition, each automated calling system is linked to the other automated calling systems over a network 28. The network may be the Internet or any other network which links the automated calling systems and provides for communications between the automated calling systems. The term "node," as used herein, refers to one of the plurality of automated calling systems connected by the network. Accordingly, the system shown in FIG. 1 has 4 nodes.

Figure 2:
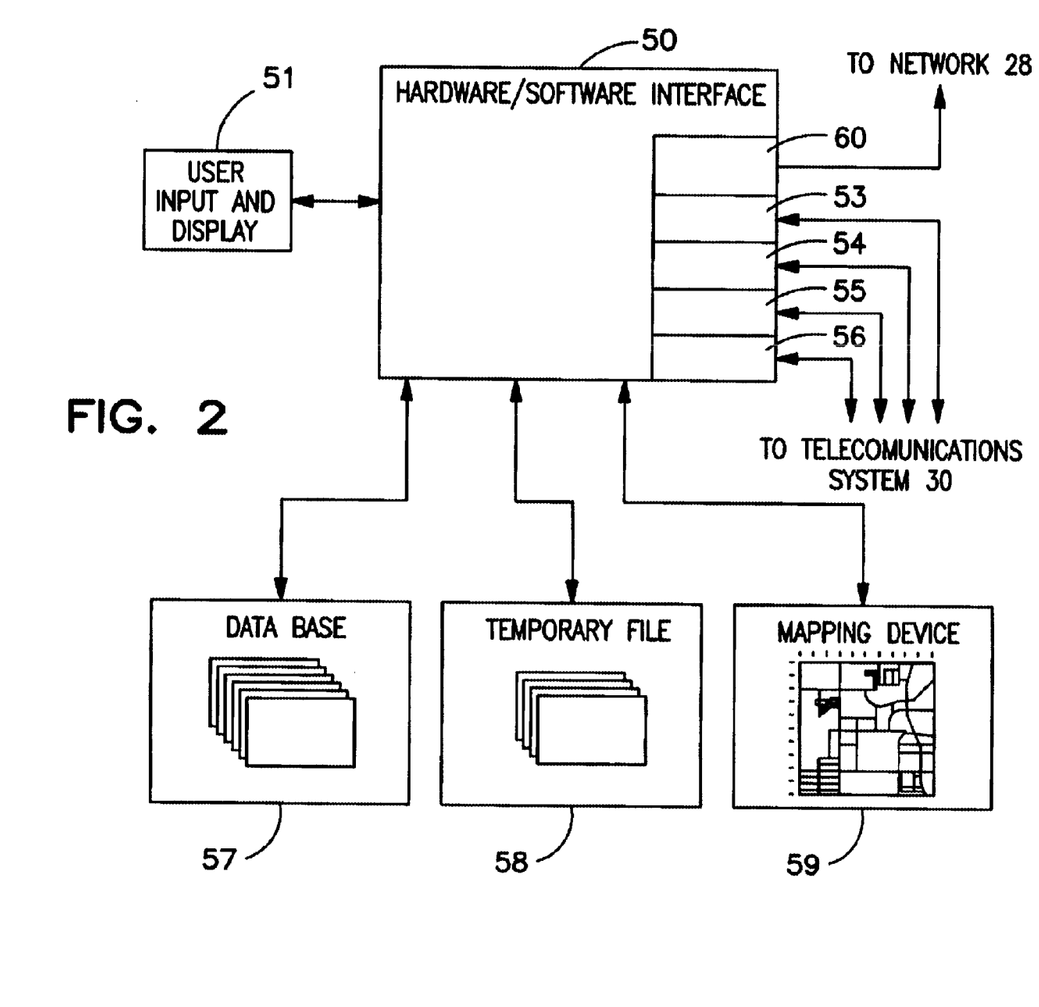
FIG. 2 shows the elements of a node of the automated nodal calling system of FIG. 1.

A more detailed representation of an automated phone calling system, such as the Zionsville node 12, is shown in FIG. 2. Each of the other automated phone calling systems 14, 16 and 18 are similar to the automated phone calling system 12 shown in FIG. 2. Automated calling system 12 includes a hardware/software interface in the form of a computer 50 having a microprocessor, a hard drive, other memory and various interfaces. The computer includes input and output devices 51, a network interface 60, telecommunications interfaces 53–56, a database 57, a temporary file 58, and a mapping device 59. The input and output devices 51 may comprise several elements, including a keyboard, mouse, microphone, monitor or other display, speakers, and/or printer connected to the computer. The input and output devices 51 provide bi-directional communication between a human operator and the computer 50. In this manner, the operator may provide input to the computer and the computer may make inquiries of the operator and present reports and other information to the operator.

The network interface 60 provides for connection of the automated phone calling system 12 to the Internet 28. This Internet connection may be a direct connection using a high-speed fiber optic cable, or a connection through a telephone line linking the automated phone calling system 12 to a server connected to the Internet. Because each automated calling system is connected to others over the Internet 28, each machine is capable of communicating with other machines using the TCP/IP protocol.

Each telecommunications interface 53, 54, 55 and 56 provides the automated calling system with a connection to the telecommunications network 30, thereby allowing the system to place both local and long-distance phone calls. Each telecommunications interface represents a separate line available to the automated phone calling system when placing phone calls. Thus, the automated phone calling system may only place as many simultaneous calls as the total number of telecommunications interfaces. A typical node includes ninety-six telecommunications interfaces. The telecommunications interfaces 53–56 may comprise a plurality of plug-in phone cards which connect individual telephone lines to the computer.

The database 57 contains information about potential callees within the area served by the automated calling system. For example, because the Zionsville node 12 is located in the City of Zionsville, the database 57 contains telephone numbers of residential homes and businesses in the Zionsville area to be contacted in the event of an emergency. In addition, the database 57 also stores information in data fields associated with the telephone numbers.

These data fields must at least include a geographic area data field which contains data providing an indication of the geographic area associated with each callee's telephone number, such as a nine-digit zip code, map coordinates, or a longitude and latitude. Database 57 also includes various files containing information about past calling sessions, such as phone numbers called and call results. In addition, the database 57 includes data related to mutual assistance agreements, including nodes where call requests may be delivered and nodes from which requests may be received. Database 57 may reside on magnetic media, such as a hard disc, or optical media such as compact disc. Database 57 may include one or more different databases as described in more detail herein.

The temporary file 58 is used by the computer 50 to store temporary information required for emergency calling sessions. To this end, when an emergency call session is initiated, the temporary file is populated with records of telephone numbers to be called during the emergency call session. Associated with each phone number are a number of data fields containing data required to complete and manage each call of the calling session, as explained in more detail below. The temporary file may comprise a plurality of RAM chips or other data storage devices such as magnetic or optical discs. The temporary file is also referred to herein as the queue.

The mapping device 59 is used to define an emergency calling area. The emergency calling area may be defined in several ways using the mapping device. For example, in one embodiment of the invention the mapping device allows an operator to use the mouse to highlight portions of a map to be warned of an emergency. In an alternative embodiment of the invention, the mapping device allows the operator to simply type or otherwise indicate geographic information, such as a nine digit zip codes, to indicate the area to be warned of an emergency situation. In yet another alternative embodiment of the invention, other electronic instruments, such as local Doppler radar, are used in association with the mapping device 59 and the computer 50 to automatically define an emergency area, based upon readings from the electronic instruments. In any event, the term mapping device is used herein to refer to a component of the system that accepts input data that is used to define a geographic area to be called using the automated calling system.

The automated calling system 12 is used to deliver warning calls to city residents and businesses in the event of an emergency. After the city determines that an emergency condition exists, the city must first determine the emergency area needing to be warned of the emergency. Once this area is determined, the mapping device is used to define an emergency area where warning calls will be placed using the automated phone calling system. The operator then uses the input device 51, such as a microphone, to record an emergency message to be transmitted to the emergency area. This emergency message is saved in the database 57 under a unique filename. Once the emergency message is recorded, the computer 50 populates the queue 58 with phone numbers from the database 57 having an associated geographic location within the emergency area. As mentioned previously, other information for use by the system in placing the warning calls is also delivered to the queue at the time the queue and stored in data fields associated with the telephone numbers. The additional information in the data fields is used by the system to manage and place phone calls to callees within the emergency area. After the queue 58 is populated, the computer 50 uses telecommunications interfaces 53–56 to automatically place calls to the telephone numbers stored in the queue 58. When the system places a call and the callee picks up the phone, the emergency message is automatically played to the callee, and the system notes that the callee has been contacted about the emergency situation.

As mentioned previously, some emergency situations arise with very little advance warning. In these "rapid response" situations, a city may need to warn many citizens of the emergency within a very short warning period. Unfortunately, one automated calling system may not have the capacity to deliver a warning to all individuals in the emergency area within the short warning period. However, as shown in FIG. 1, because all nodes of the automated nodal calling system are connected by a network 28, one node with a large number of calls (i.e., an "originating" node) may contact another node on the network (i.e., a "remote" or "receiving" node) and request the remote node to place additional phone calls for the originating node. Thus, the automated nodal calling invention provides a mechanism for pooling the resources of neighboring cities to deliver warning messages in a short period of time.

Figure 3:
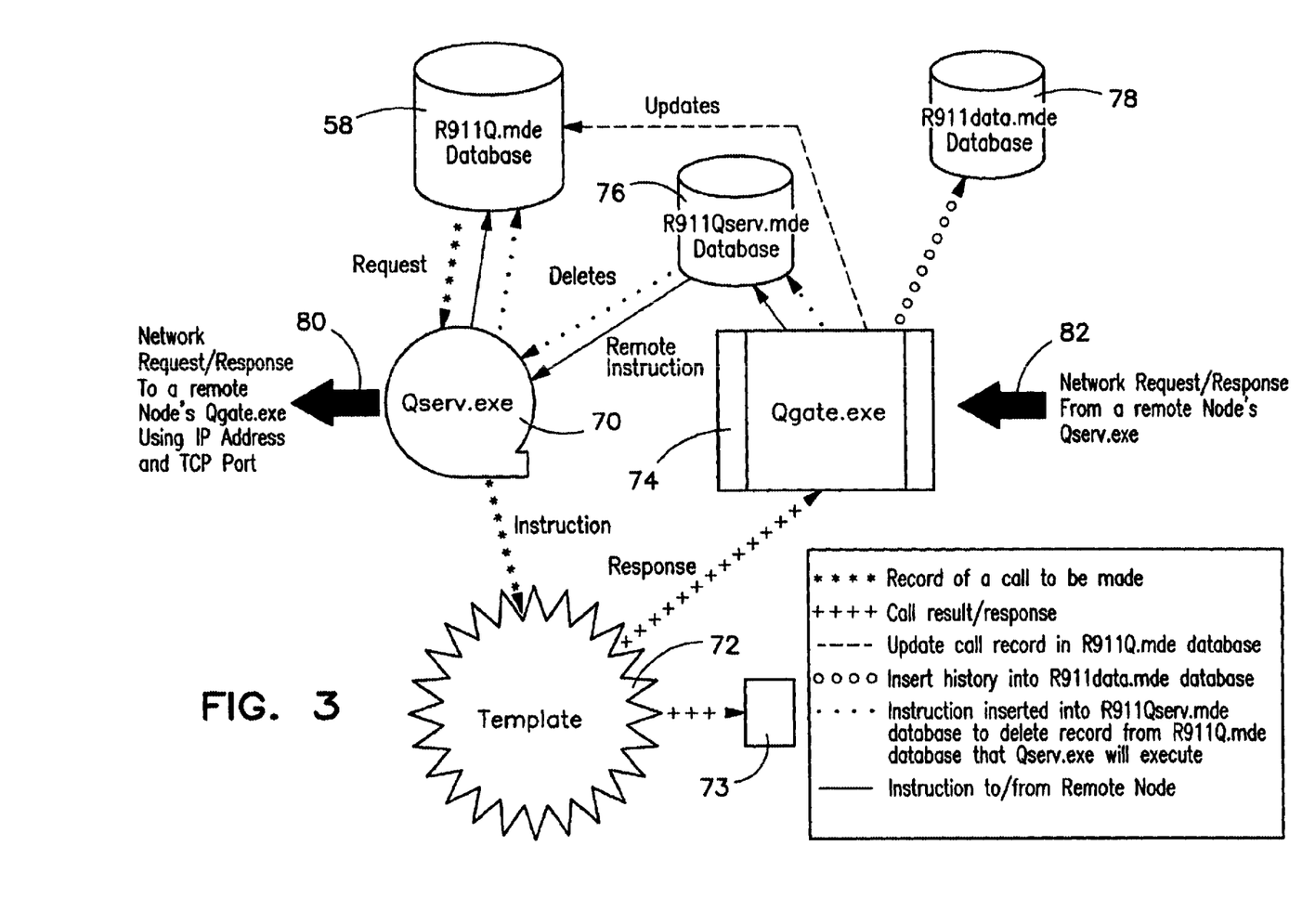
FIG. 3 shows the method of operation of a node of the automated calling system of FIG. 1.

FIG. 3 shows the operation and flow of data within one node of the automated nodal calling system. FIG. 3 will first be used to describe the originating node's method of operation. The originating node is the node that sends a request to a remote node asking the remote node to assist in placing a phone call to a telephone number within the originating node's database. FIG. 3 will later be used to describe the receiving node's method of operation. The receiving node is the node that accepts requests from other nodes to place phone calls.

When an emergency situation occurs, requiring a warning message to be sent to individuals in danger, the operator defines the emergency area using the mapping device. After the emergency area is defined, the operator creates a warning message and stores the message in the originating node's database 57. The emergency message may be in any number of formats including voice or text messages, depending upon the type of call that will be made. For example, if the call is to be made to a residential phone, the emergency message will be a voice message. On the other hand, if the emergency message is to be delivered to a fax machine, a fax message will be created. After the emergency message is created, it is stored in the database 57 along with other emergency messages.

Next, the system 12 retrieves all phone numbers from the database 57 having associated geographic areas within the emergency area, and delivers these phone numbers to the queue 58. As phone numbers are delivered to the queue 58, the system creates a record for each phone number which includes a number of data fields. In addition to the phone number, each record placed in the queue contains the following data fields: call type, message file, session name, priority, number of attempts, maximum attempts, response required, allowed node names, assigned node, stale timeout, originating node, and port. Each complete record is called a call request. Information in the data fields is used by either the originating node to manage the delivery of call requests or by the receiving node to process call requests and make phone calls delivering the warning message.

The "call type" field indicates the type of message that will be sent, such as voice message, fax message, pager, etc. The "call type" field is used by the receiving node to configure the node to deliver the proper type of message.

The "message file" field is also used by the receiving node and contains the file name of the message to be delivered.

The "session name" field contains a name given to the calling session by the originating node. Because both the originating node and the receiving node keep records of all call requests, calls made during a particular calling session are easily identified by the session name.

The "priority" field indicates the priority of the particular phone call. The priority of the phone call is a number between one and ten, ten being the highest priority, and one being the lowest priority. The "priority" field is used by the originating node and the receiving node to determine which calls to make first based, at least in part, on the priority. Thus, the system will make a call for a priority ten request before making a call for a priority eight or nine request.

The "number of attempts" field indicates the total number of times that the system has attempted to contact the phone number in the call request. When the phone number is first delivered to the queue, the originating node will assign a zero to the "number of attempts" field. However, after each unsuccessful attempt to contact the receiving node, the "number of attempts" field is updated to show the total number of times the system has attempted to contact the phone number in the record.

Associated with the "number of attempts" field is the "maximum attempts" field. The "maximum attempts" field contains the maximum number of attempts that the system should make in trying to deliver the warning message to the number in the record. Once the "number of attempts" field reaches the same number shown in the "maximum attempts" field, the system will discontinue efforts to contact the phone number in that record.

The "response required" field indicates whether a response to the call is expected. A "yes" in the "response required" field instructs the system to wait for a response to the particular phone call from the callee. A "no" in the "response required" field tells the system that there is no need to wait for a response from the callee.

The "allowed node names" field indicates the remote nodes to which the originating node may deliver the call request. Similarly, the "given to node" field indicates the remote node to which the originating node actually delivered the call request.

The "stale timeout" field indicates the deadline that the receiving node has for responding to a call request. If the receiving node does not process the call request within the stale timeout period, the receiving node is instructed not to process the call. On the other hand, if the originating node does not receive a call response for a call request within the stale timeout period, the originating node will send the call request to a different node. Use of the stale timeout is explained in more detail below.

The "from node" field simply indicates the originating node. This node is used by the remote node to determine where to report the success or failure of a call.

Finally, the "port" field indicates a communications port of the originating node to which the receiving node is instructed to respond. This communications port is generally expressed as the IP address of the originating node and associated port. In this manner, the "port" field is intended to assist with network communications by providing the receiving node with clear instructions on where to deliver information about the calls made by the receiving node.

With a queue 58 full of call requests for the call session, a program entitled "Qserv" begins to copy or "pull" call requests from the queue. With reference to FIG. 3 as the originating node, the Qserv program 70 is shown. The Qserv program 70 pulls call requests from the queue based upon certain indexing and logic. For example, as discussed previously, call requests with a high priority are pulled before call requests with a low priority. In addition to looking at priority, the Qserv program 70 also considers the number of times that the system has already attempted to contact a particular phone number. Thus, call requests with a low number of attempts are pulled before call requests with a high number of attempts.

Once a call request is pulled by the Qserv program 70, the Qserv program must determine whether the call request should be processed by the local node (i.e., the originating node) or a remote node on the network. Qserv 70 sends all call requests to the local node for processing unless all of the local node's lines are busy making other calls.

If all of the local node's lines are not busy, Qserv 70 transforms the call request into a call instruction for delivery to an executable template program 72 for processing. The template program 72 interacts with one of the telecommunications interfaces 53–56 to secure a line on the telecommunications system 30. Having secured a line, the template program 72 dials the phone number in the call request and waits for an answer from the callee. If the callee answers the phone, the template program 72 retrieves the warning message from the database 57 and plays the warning message to the callee. If a response is required from the callee, the template records the response and terminates the call. If any problem occurs during the call session which makes the call unsuccessful, the template notes the reason for the failure of the call. Reasons for call failures include, but are not limited to, a busy line, fax machine detection, detection of an operator, or improper response from callee.

At the completion of the call, the template program generates a call response record for the phone number called. The call response record is then delivered to a program 74 entitled "Qgate". Each call response record delivered to the Qgate program 74 includes the following data fields in addition to the phone number: call success, session name, time of try, call result, callee response, number dialed, and given to node.

The "call success" field contains an indication of whether or not the call was successful.

The "session name" field contains the name given to the calling session, as discussed above.

The "time of try" field contains information about the time the call was made.

The "call result" field contains specific information about what happened during the call. For example, if the call was unsuccessful, the "call result" field may indicate that the call was busy or that a fax machine was detected.

The "callee response" field contains more detailed information about the specific response from the callee. For example, the "callee response" field may indicate that a Touch Tone response of "1" was given instead of the expected response of "#".

The "dialed" field contains information about the specific dial string used by the template to make the call. Thus, if a long distance call was made, the "dialed" field will contain a eleven-digit call string, as opposed to a seven digit call string for a local call.

Finally, the "given to node" contains an identification of the node making the call.

In addition to delivering the call response to the Qgate program 74, the template program logs transaction information to an ASCII file 73 which can be used to determine the events of each call transaction for historical purposes.

The Qgate program 74 takes the data contained in a call response record and generates an SQL (i.e., structured query language) statement. The SQL statement is an instruction that tells the queue 58 to either (i) remove the call request record from the queue (e.g., because the call was successful), or (ii) leave the call request record in the queue, but update the call record to reflect the results of the last call attempt. SQL statements to remove a call request from the queue are first delivered to the Qserv database 76 before they are retrieved by the Qserv program 70 and delivered to the queue 58. On the other hand, SQL statements to simply update the call request are delivered directly to the queue. For example, if a call is successful to a particular phone number in an emergency area, an SQL statement will be delivered to the Qserv database 76, instructing the queue 58 to remove the call request containing the phone number from the queue 58. To this end, the Qserv program 70 periodically polls the Qserv database for any new SQL statements. When an SQL statement is found in the Qserv database 76, the Qserv program 70 pulls the SQL statement from the Qserv database 76 and executes the statement against the queue 58 to remove the call request containing the completed call from the queue 58. Conversely, if a call to a particular phone number is not successful and more call attempts should be made, the SQL statement generated by the Qgate program 74 will be delivered directly to the queue 58, instructing the queue to update the call request to reflect the latest call attempt. A typical update may be, for example, changing the data in the "number of attempts" field from one to two attempts made.

When the Qgate program 74 generates an SQL statement to remove a call request, Qgate 74 sends the call response data associated with the SQL statement to a data.mde database 78. The data.mde database stores a record of all call responses to be removed from the queue 58 so the system has a record of the call response and a reason for removal from the queue.

When the Qserv program 70 pulls a high priority call request from the queue 58 and all of the local node's lines are busy making other calls, the Qserv program knows to deliver the call request to a remote node. When the Qserv program 70 sends call requests to a remote node, it sends the same number of requests as the local node's database 57 lists as available lines for that node. The number of lines made available between nodes is generally set forth in a mutual assistance agreement. Call requests are distributed from the originating local node to the remote node over the Internet 28, as indicated by delivery arrow 80.

FIG. 3 is now used to describe the operation and flow of data when call requests are delivered from an originating node to a remote node. With reference to FIG. 3 as the remote node, call requests are received at the remote node as indicated by receipt arrow 82 by the Qgate program 74. Upon receipt of a call request, the Qgate program 74 looks at the "message file" field and checks to see if the local hard drive has the vox (or other) file containing the warning message. If the vox file containing the warning message is not on the local hard drive, the Qgate program 74 sends an FTP request back to the originating node asking the originating node to send the vox file to the remote node. After the remote node receives the vox file from the originating node, it is stored on the remote node's hard drive. Once the Qgate program 74 confirms that the remote node has a copy of the vox file containing the warning message, the Qgate program takes the call request and delivers an SQL statement to the Qserv database 76 which instructs the Qserv program 70 to load the call request into the queue 58. The Qserv program 70 then populates the queue 58 with the call request. Next, the Qserv program 70 determines which call requests in the queue should be processed first. As mentioned previously, this determination is based in large part on the priority of the call record in the queue. Thus, the highest priority call requests will be processed before lower priority call requests.

When the Qserv program 70 at the remote node pulls a call request indicating an origin other than the remote node, the Qserv program knows not to send the call request to any other node for processing. Instead, call requests received from other nodes must be processed by the remote node receiving the call request. When processing a call request received from an originating node, the remote node transforms the call request into a call instruction and sends the call instruction to the template program 72.

When the template program 70 receives the call instruction, it first determines whether the phone number to be called is a local or long distance call. The database 57 at the remote node includes a listing of the area code and exchanges that are local calls for that node. All calls not having this area code and one of the local exchanges are determined to be long distance calls. When a long distance call is placed, the system knows to dial a "1" first, to indicate a long distance call, and then dial the complete ten-digit phone number. On the other hand, if the call is only a local call for the node, the system dials only the seven or ten digit phone number of the local call.

After determining the dial string to make the call, the template program 72 interacts with one of the telecommunications interfaces 53–56 to secure a line on the telecommunications system 30. After securing a line, the template program 72 dials the dial string and waits for an answer from the callee. If the callee answers the phone, the template program 72 plays the warning message to the callee If a response is required from the callee, the template records the response and terminates the call. If any problem occurs during the call session which makes the call unsuccessful, the template notes the reason for the failure of the call. As mentioned previously, reasons for call failures include, but are not limited to, busy lines, fax machine detected, operator detected, or improper response from callee.

At the completion of the call, the template program 72 generates a call response record for the phone number called. Each call response record includes the following data fields in addition to the phone number: call duration, call success, session name, time of try, call result, callee response, number dialed, and given to node. The information contained in each of these fields is the same as that described previously for each call response record field when the call response is processed by the originating node. After generating the call response, the template program 72 delivers the call response to the Qgate program 74 for processing. In addition to delivering the call response to the Qgate program, the template program 72 logs transactions to the ASCII file 73 which can be used to determine the events of each call transaction for historical and billing purposes.

After receiving a call response from the template program 72, the Qgate program 74 takes the data contained in the call response and generates an SQL statement to remove the call request from the remote queue (i.e., the queue associated with the "remote node"). At the remote node, all call requests are removed from the remote queue 58 after one call attempt, regardless of whether or not the call attempt was successful. The SQL statement to remove the call request from the remote queue is first delivered to the Qserv database 76 before it is retrieved by the Qserv program 70. Thus, the Qserv program 70 periodically polls the Qserv database for any new SQL statements. When an SQL statement is found in the Qserv database 76, the Qserv program 70 pulls the SQL statement from the Qserv database 76 and executes the statement against the queue 58 to remove the call request containing the completed call from the queue 58.

When the Qgate program 74 generates an SQL statement to remove a call request from the remote queue, it also generates an SQL statement for delivery to the originating node. The SQL statement for delivery to the originating node is based on the call response and instructs the queue 58 of the originating node to either (i) remove the call request record from the queue, or (ii) leave the call request record in the queue, but update the call record to reflect the results of the last call attempt. The SQL statement to the originating node is also delivered to the Qserv database 76 where it is pulled by the Qserv program 70. When the Qserv program 70 pulls the SQL statement to be executed by the originating node, the Qserv program 70 sends the SQL statement to the originating node over the Internet, as indicated by arrow 80, thereby allowing the originating node to update its queue.

Referring to FIG. 3 again as the originating node, the Qgate program 74 of the originating node receives the SQL statement delivered over the Internet from the remote node, as indicated by receipt arrow 82. The Qgate program 70 takes the SQL statement and delivers it to the Qserv database 76. As mentioned previously, the SQL statement is an instruction that tells the queue 58 to either (i) remove the call record from the queue, or (ii) leave the call in the queue, but update the call record to reflect the results of the last call attempt. SQL statements in the Qserv database 76 are executed against the queue 58. To this end, the Qserv program 70 periodically polls the Qserv database 76 for any new SQL statements. When an SQL statement is found in the Qserv database 76, the Qserv program executes the statement against the queue.

Exemplary Operation

An exemplary operation of the automated nodal calling system will now be described with reference to the exemplary system shown in FIG. 1. Four cities having mutual assistance agreements are shown in FIG. 1. These cities are Zionsville, Carmel, Mooresville, and Greenwood, and each city has agreed to lend its resources to the neighboring cities in the event of an emergency. As shown in FIG. 1, each city has an automated phone calling system that is linked to the other automated phone calling systems using the Internet 28. Preferably, each automated phone calling system has a dedicated line which provides a continuous Internet connection.

Under the exemplary system of FIG. 1, an emergency situation exists where Zionsville has detected a tornado moving directly toward the city. Based on the projected path of the storm, a Zionsville operator maps the emergency area using the mapping device 59. The operator also sets a time deadline when all calls within the emergency area should be made, and sets a high priority to the calls, such as a priority ten. Next, using the input device 51 an operator records an emergency warning message to be delivered to the residents in the emergency area. The warning message is a voice message that will be delivered to callees through their telephones. The system operator also prioritizes which other nodes should be contacted once all of Zionsville's calling lines are filled. For example, the system operator may instruct the Zionsville node to first contact Carmel, then Mooresville, and then Greenwood when distributing calls to other nodes.

Based on the emergency area defined by the mapping device, the system 12 determines, for example, that five hundred warning calls need to be made in the Zionsville area. The system then loads each of these phone numbers into the queue 58 and builds a call request record for each phone number. As discussed previously, each call request record includes a number of data fields with information important for tracking and processing the call request.

With a large number of high priority call requests in the queue which must be processed in a short period of time, the Zionsville node first sends as many call requests to its own system as possible, until all telecommunications interfaces on the Zionsville node are busy processing call requests. Then, the Zionsville node uses the Internet to contact other nodes and request those nodes to assist in making the calls to Zionsville's emergency area. Before sending call requests to remote nodes, Zionsville's system 12 first obtains the node list from the database 57. The node list includes a number of network addresses of neighboring nodes that may be contacted when help is required to complete phone calls, along with the total number of lines available at each node. These nodes are located in other cities that have entered into mutual assistance agreements with the city of Zionsville. In the present example, these cities include Carmel, Mooresville, and Greenwood. Zionsville's system then sends call requests to the neighboring systems over the Internet, asking the neighboring systems to make emergency calls on behalf of Zionsville. According the above-described situation, the Zionsville system is the "originating" or "requesting" node or system and the Carmel, Mooresville and Greenwood systems are the "remote" or "receiving" nodes or systems. Delivery of call requests will be primarily described with reference to the Carmel system, which in the present example is the first remote node contacted by the Zionsville node. The Mooresville and Greenwood systems are designed to operate similar to the Carmel system.

Before the Zionsville node decides to send a call request to the Carmel node, it first checks the node list to determine the total number of lines available for use at the Carmel node. If Carmel has a total of fifty lines available to Zionsville for making calls, the Zionsville node sends fifty call requests to the Carmel node. Each call request is pulled from the Zionsville queue 58 by the Zionsville Qserv program 70, as shown in FIG. 3. As call requests are pulled, a note is made in the queue 58 of the local node indicating the remote node where each call request will be delivered. The Qserv program 70 then sends each call request to the Carmel node over the Internet 28, as indicated by delivery arrow 80.

As each call request is transmitted to Carmel, the Zionsville node notes the time by which a response is required back from the Carmel node indicating whether or not the call was successful. This time is known as the "stale timeout." The stale timeout is a pre-determined amount of time after the call request is sent from the Zionsville node to the Carmel node. At the expiration of this stale timeout, the Carmel node will ignore the call request and the Zionsville node will send the call request to another node for processing. For example, the predetermined period of the stale timeout may be two minutes. This provides the Carmel node with two minutes to process the call request, make the call, and send a call response back to the Zionsville node indicating whether the call was successful or not. If Carmel does not send a call response back to the Zionsville node within this two-minute period, the Zionsville node will send the call to another node for processing. Likewise, if the Carmel node does not begin processing of the call request before the stale timeout period, it will ignore the call request and prevent the call request from being processed at the Carmel node.

With reference now to FIG. 3 as the Carmel node, which is the receiving node, Carmel's Qgate program 74 accepts the call request over the Internet, as indicated by receipt arrow 82. The call request accepted by the Carmel Qgate program includes an indication that the call request was sent by the Zionsville node. When the Carmel Qgate program 82 receives the call request, it checks the node list stored in the database 57 to make sure that the Carmel node has authorization to process the Zionsville call request. The node list includes a list of all nodes from which the Carmel node is authorized to process call requests. If the Carmel node receives a call request from an originating node that is not on the node list, the Carmel node will ignore the call request. In the present example, because Carmel has entered into a mutual aid agreement with Zionsville, Zionsville will be listed on the node list, and the Carmel node will process the call request.

After accepting the call request and determining that the Carmel node has authorization to process the call request, the Qgate program looks at the "message file" field in the call request and checks to see if the Carmel hard drive has the vox (or other) file containing the warning message to be played to the callee. If the file containing the warning message is not on the Carmel hard drive, the Qgate program sends and FTP request back to the Zionsville node asking the Zionsville node to send the message file to the Carmel node. After the Carmel node receives the message file from the Zionsville node, it is stored on the hard drive of the Carmel node. For example, assume the call request sent from Zionsville to Carmel includes a message filename in the message file field entitled "Zionsville153.vox." After receiving the call request, the Carmel node determines whether a copy of the Zionsville153.vox file has already been stored in the Carmel hard drive. If not, the Carmel node contacts the Zionsville node to request the Zionsville node to transfer the Zionsville153.vox file to the Carmel node. When the Carmel node receives this file, it stores the file in the Carmel hard drive. With this message file stored in its hard drive, the Carmel node can easily pull the warning message from its hard drive for delivery to a callee when the callee answers the phone. In addition, by storing the Zionsville153.vox file in the Carmel node's hard drive, the Carmel node will have a copy of the warning message that it sent with the call request for future reference.

After confirming that the Zionsville node has a copy of the file identified in the message file field, the Carmel Qgate program translates the call request into an SQL statement and delivers the SQL statement to the Qserv database 76. Carmel's Qserv program 70 then reads the SQL statement and loads the call request into Carmel's queue 58. Once loaded in the queue, the Zionsville call request is ready for processing by the Carmel node.

Calls are processed from Carmel's queue based upon their priority, as discussed previously. Nevertheless, the Carmel node will place a higher importance upon its own high priority calls than those high priority calls received from other nodes. In other words, the Carmel node will gladly assist the Zionsville node in making emergency phone calls, so long as emergency calls do not need to be made in Carmel at the time of the call request from Zionsville. Thus, when a call request is delivered from the Zionsville node to the Carmel node, the call request includes a call priority number ranging from 1–10, with 10 being highest priority. Depending on the details of the mutual assistance agreement between Zionsville and Carmel, Carmel will automatically subtract a number from the priority to reflect the importance of the Zionsville call to the Carmel node. For example, if the Zionsville node sends a call request with a priority 10, Carmel may subtract 1.5 points from the priority, and enter the call as a priority 8.5 in the Carmel queue. Thus, if Carmel has any calls with a priority higher than 8.5, these calls will be made by the Carmel node before the Zionsville priority 10 call. On the other hand, if Carmel does not have any calls to make with a priority higher than 8.5, the Zionsville priority 10 call, stored in the Carmel queue as an 8.5 priority, will be the first call made by the Carmel node. This priority scheme allows Carmel to send its own high priority calls before it sends calls from other nodes. Thus, Carmel citizens will have priority use of their own automated calling system, and high priority Carmel calls will not be put off by an equally high priority request from a remote node such as Zionsville. Of course, Carmel will have other mutual assistance agreements with other cities, and the priority deduction amount will be set forth in the mutual assistance agreement for these other cities. For example, a mutual assistance agreement between Carmel and Greenwood may specify that 1.8 points will be deducted from call requests from the Greenwood node to the Carmel node. Thus, the Carmel node will process priority 10 call requests from Zionsville before it processes priority 10 call requests from Greenwood.

With adjustments made to call requests from other nodes to account for priority, the Carmel node will begin processing the call requests in the queue 58. Assuming that the call requests originating from the Zionsville node have high priority, the Zionsville call requests will be processed first, assuming that the stale timeout period has not expired for those call requests. With reference to FIG. 3, the Qserv program 70 pulls call request from the queue 58 for processing, translates the call request into a call instruction, and delivers the call instruction to the template 72.

When processing call instructions, the Carmel template 72 first acquires access to a line on the telecommunications system 30. The template 72 then determines whether the phone number in the call request is a local or long distance call by checking area codes and exchanges against known local area codes and exchanges. If the phone number is a long distance call, the template dials the complete long distance dial string, including a "1" and the area code, followed by the seven-digit number. If the phone number is a local call, the template simply dials the seven or ten digit local number. After the callee answers the phone call, the template plays the emergency message for the callee. As mentioned previously, the emergency message is stored in the Carmel node on the hard drive.

If the call placed to the callee using the phone number in the call request is successful and the callee receives the emergency warning message, the template 72 notes the success of the call. On the other hand, if for some reason the call placed to the callee using the phone number in the call request is unsuccessful, the template 72 notes the reason for the lack of success. Typical reasons for unsuccessful phone calls include failure of the callee to properly respond to the phone call, no answer, busy number, operator indication of invalid number, or contact with other device such as fax machine or pager.

After the Carmel template 72 attempts to process the call request from the Zionsville node, the template 72 delivers a call response providing the details of the call result to the Carmel Qgate program 74. The Qgate program 74 then generates an SQL statement to remove the call request from the Carmel queue 58 and delivers the SQL statement to the Qserv database 76. At the same time, the Qgate program 74 generates an SQL call response command to remove or update the call request in the Zionsville node's queue, based upon the call response. This call response command is delivered to the Qserv database 76 and pulled by the Qserv program 70. The Qserv program 70 then sends the call response command to the Zionsville node using the Internet, as indicated by delivery arrow 80. The Zionsville node accepts the call response command using the Zionsville Qgate program 74, as indicated by receipt arrow 82. The Zionsville Qgate program 74 delivers the call response information to the data.mde database 78 for the system's historical records. Zionsville's Qgate program 74 also delivers the call response command in the form of and SQL statement to the Qserv database. The SQL statement instructs the queue to update a particular call request to reflect the information delivered in the call response from the Carmel node. The SQL statement may instruct the queue to remove the particular call request from the queue because the emergency warning message was successfully delivered to the phone number in the call request. Alternatively, the SQL statement may instruct the queue to simply update the call request to indicate the last unsuccessful attempt at delivering the emergency warning message. After the SQL statement is delivered to the Qserv database 76, the Qserv program 70 executes the SQL statement against the queue 58 and updates the queue.

In addition to updating and removing call records from the queue based on SQL statements in the Qserv database 76, the Zionsville node 12 also performs periodic maintenance on the queue 58 which updates or removes call records from the queue. For example, if the number of attempts in the call record is equal to the maximum attempts allowed by the system during the calling session, the call record will be removed from the queue, and no more calls will be attempted to the phone number associated with that call record. In addition, call requests which were not processed before the warning deadline are removed from the queue, to avoid alarming callees of an emergency after it has passed.

As discussed previously, if the Zionsville node does not receive a call response back from the Carmel node within the stale timeout period, the Zionsville node will send the call request to a new node for processing. At the same time, if the Carmel node does not process a Zionsville call request before the stale timeout period, the Carmel node may remove the Zionsville call request from its queue. This stale timeout procedure allows the Cannel node to completely ignore the Zionsville call requests without having to inform Zionsville that it will not process its call requests. For example, if Carmel has its own emergency at the time it is contacted by Zionsville, Carmel may receive the call requests from Zionsville, but may not process them before the stale timeout period because its own higher priority call requests are processed first. Importantly, the fact that Carmel does not process the Zionsville call requests does not have an affect upon Zionsville, because the call requests will simply be sent to other nodes after the stale timeout period. During this period, Zionsville may even continue to send call requests to Carmel, even though Zionsville is not receiving call responses from Cannel. Should Carmel complete its high priority calls before Zionsville, Carmel may receive additional call requests from Zionsville, and may be of assistance to Zionsville in processing call requests. Thus, the automated nodal calling system of the present invention provides each node with the ability to unilaterally opt in and opt out of processing call requests from remote nodes.

Figure 4:
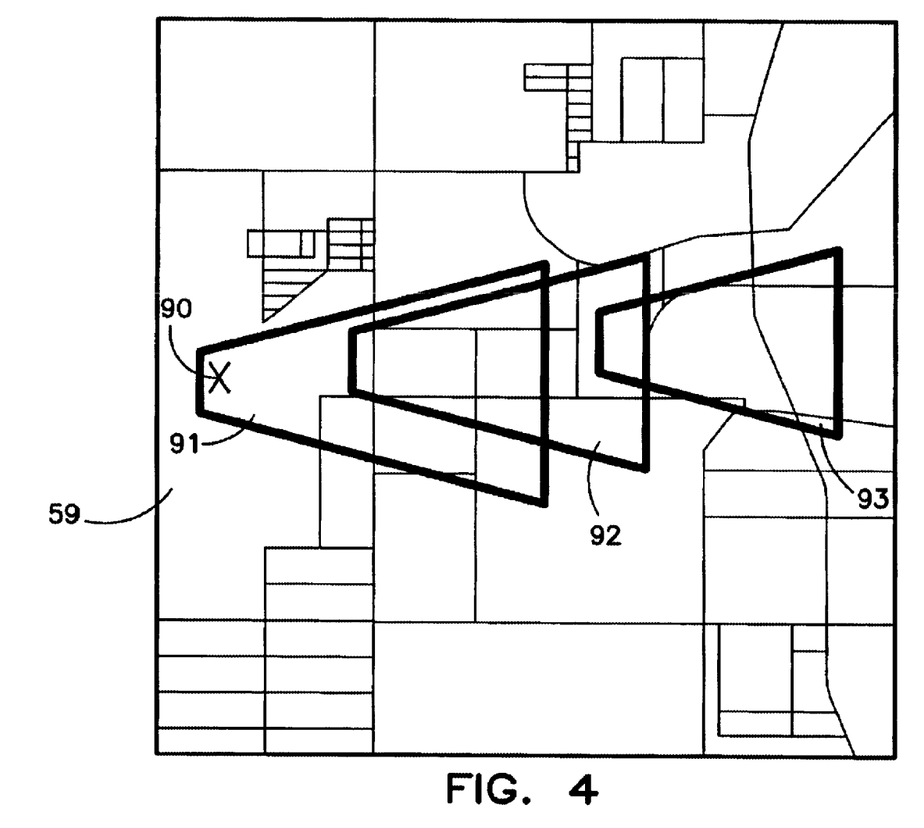
FIG. 4 shows the automated nodal calling system of FIG. 1 having an alternative mapping device.

In an alternative embodiment of the invention, the mapping device 59 is capable of continuous upgrades to the emergency area. Such continuous upgrades may be useful when tracking the path of a weather event. For example, with reference to FIG. 4, if a tornado is spotted by Doppler radar at location "X" 90, the mapping device 59 will automatically projects a first trapezoidal path of the storm 91, based upon the information available to the mapping device. This first trapezoidal area 91 is then defined as the first emergency area and phone numbers having geographic identifiers within this first trapezoidal area 91 are loaded into the queue 58 for receiving an emergency warning call. As the storm moves within the first trapezoidal path 91, the system updates the projected path of the storm to a second trapezoidal area 92. The system then updates the queue 58 to include phone numbers having associated geographic identifiers included in the second trapezoidal area 92, but not in the first geographic area 91. At the same time, the system upgrades the queue to remove all phone numbers remaining in the queue if they are not within the second trapezoidal area. Thus, if a warning message has not been delivered to a callee within the first geographic area, but the storm has already passed the callee, the callee will not be alarmed by a warning about the storm. As the storm continues to move, the system periodically projects a new trapezoidal path, such as the third trapezoidal path 93 shown in FIG. 4.

Although the present invention has been described in considerable detail with reference to certain preferred versions thereof, other versions are possible. For example other data fields could be included with call requests or call responses, such as the time and date of the first call try and the time and date of the last call try. In addition, a number of different network arrangements could be used in place of Internet to provide network connections between the nodes. Therefore, the spirit and scope of the claimed invention should not be limited to the description of the preferred versions contained herein.

What is claimed is:

1. A method of automatically placing phone calls to callees in a calling area, the method comprising the steps of:
   a. providing a database comprising a plurality of phone numbers and at least one data field associated with each of the plurality of phone numbers, the at least one data field containing information representing a geographic location;
   b. recording a message to be transmitted to the callees;
   c. defining a calling area to receive the recorded message, the calling area used to select a subset of phone numbers from the database, each of the subset of phone numbers having information representing a geographic location within the calling area in the at least one data field associated with the phone number;
   d. generating call requests and storing the call requests in a queue, each of the call requests containing one of the phone numbers from the subset of phone numbers selected from the database;
   e. initiating calls to callees based on a first group of the generated call requests; and
   f. sending a second group of the generated call requests to a remote node, the remote node operable to initiate phone calls to callees based on the second group of call requests.

2. The method of claim 1 further comprising the step of receiving call requests from the remote node and each call request received from the remote node containing a phone number not contained in the database.

3. The method of claim 2 further comprising the step of storing the call requests from the remote node in the queue and initiating phone calls to callees using the call requests from the remote node.

4. The method of claim 1 the calling area is an emergency area, and the emergency area is automatically updated periodically to a new emergency area.

5. The method of claim 4 wherein the emergency area is automatically updated based upon the path of a weather event.

6. The method of claim 5 wherein, the new emergency area is used to select a new subset of phone numbers from the database, each of the new subset of phone numbers having information representing a geographic location within the new emergency area in the at least one data field associated with the phone number.

7. The method of claim 1 wherein the message to be transmitted to the callees is an audio message.

8. The method of claim 1 wherein the message to be transmitted to the callees is a fax message.

* * * * *

(12) EX PARTE REEXAMINATION CERTIFICATE (5765th)
United States Patent
Langsenkamp et al.

(10) Number: US 6,678,358 C1
(45) Certificate Issued: May 15, 2007

(54) AUTOMATED NODAL CALLING SYSTEM (75) Inventors: Al Langsenkamp, Colebrook, NH (US); Kent E. Kercheval, Sheridan, IN (US)

(73) Assignee: Sigma Communications, Inc., Indianapolis, IN (US)

Reexamination Request:
No. 90/007,361, Jan. 3, 2005

Reexamination Certificate for:
Patent No.: 6,678,358
Issued: Jan. 13, 2004
Appl. No.: 09/845,236
Filed: Apr. 30, 2001

(51) Int. Cl.
H04M 1/64 (2006.01)

(52) U.S. Cl. .............. 379/69; 379/33; 379/45; 379/48; 379/88.23

(58) Field of Classification Search ............ 379/40, 379/41, 49, 51, 69, 266.04, 266.05, 266.07, 379/267.07
See application file for complete search history.

(56) References Cited

U.S. PATENT DOCUMENTS

| | | | | |
|---|---|---|---|---|
| 5,121,430 A | * | 6/1992 | Ganzer et al. | 380/258 |
| 5,260,986 A | * | 11/1993 | Pershan | 455/413 |
| 5,278,539 A | * | 1/1994 | Lauterbach et al. | 340/539.18 |
| 5,436,965 A | * | 7/1995 | Grossman et al. | 379/266.08 |
| 5,448,618 A | * | 9/1995 | Sandlerman | 379/41 |
| 5,557,658 A | * | 9/1996 | Gregorek et al. | 379/88.25 |
| 6,021,177 A | * | 2/2000 | Allport | 379/48 |
| 6,084,510 A | * | 7/2000 | Lemelson et al. | 340/539.13 |
| 6,112,075 A | * | 8/2000 | Weiser | 455/404.1 |
| 6,463,273 B1 | * | 10/2002 | Day | 455/404.1 |
| 6,556,664 B1 | * | 4/2003 | Langsenkamp | 379/69 |
| 6,567,504 B1 | * | 5/2003 | Kercheval et al. | 379/69 |
| 6,621,900 B1 | * | 9/2003 | Rice | 379/266.07 |
| 6,710,711 B2 | * | 3/2004 | Berry | 340/540 |
| 6,724,861 B2 | * | 4/2004 | Newland et al. | 379/49 |
| 6,745,021 B1 | * | 6/2004 | Stevens | 455/404.1 |
| 6,792,081 B1 | * | 9/2004 | Contractor | 379/45 |
| 6,816,878 B1 | | 11/2004 | Zimmers et al. | |
| 6,842,774 B1 | * | 1/2005 | Piccioni | 709/207 |
| 6,882,708 B1 | * | 4/2005 | Bedingfield et al. | 379/88.18 |
| 6,912,270 B1 | * | 6/2005 | Drury et al. | 379/51 |
| 6,912,271 B1 | * | 6/2005 | Tuttle | 379/69 |
| 2002/0054670 A1 | * | 5/2002 | Shtivelman | 379/88.16 |
| 2002/0067806 A1 | * | 6/2002 | Rodriguez et al. | 379/88.12 |
| 2002/0136381 A1 | * | 9/2002 | Shaffer et al. | 379/201.02 |

* cited by examiner

*Primary Examiner*—Roland G. Foster (57) ABSTRACT

An automated nodal calling system comprises a database having a plurality of phone numbers and associated geographic identifiers. In the event of an emergency, an emergency calling area is defined and a message is recorded for delivery to the callees in the emergency calling area. The system generates a call request for all phone numbers having an associated geographic identifiers within the emergency calling area. Each call request contains various pieces of information important to proper completion of the phone call identified in the call request. All of the call requests are stored in a queue and the system determines whether to process each call request from a local node or a remote node. A call request to be processed from a local node is delivered to a template program which connects to the telecommunications system and completes the call request to the identified phone number. After the local node completes the call request, a call response is generated to identify the result of the call request. A call request to be processed from a remote node is delivered to the remote node using a network connection. After the remote node processes the call request, the remote node sends a call response back to the local node using the network connection. In this fashion, the system is capable of efficiently contacting all callees with an emergency message by utilizing both local nodes and remote nodes to place the calls to the callees.

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 4 and 6 are determined to be patentable as amended.

Claims 2, 3, 5, 7 and 8, dependent on an amended claim, are determined to be patentable.

New claims 9–11 are added and determined to be patentable.

1. A method of automatically placing phone calls to callees in a calling area, the method comprising the steps of:
    a. providing a database comprising a plurality of phone numbers and at least one data field associated with each of the plurality of phone numbers, the at least one data field containing information representing a geographic location;
    b. recording a message to be transmitted to the callees;
    c. defining a calling area to receive the recorded message, the calling area used to select a subset of phone numbers from the database, each of the subset of phone numbers having information representing a geographic location within the calling area in the at least one data field associated with the phone number;
    d. generating call requests and storing the call requests in a queue, each of the call requests containing one of the phone numbers from the subset of phone numbers selected from the database;
    e. initiating calls to callees based on a first group of the generated call requests; and
    f. sending a second group of the generated call requests to a remote node, *wherein the second group of the generated call requests is different from the first group of generated call requests, and wherein* the *second group of generated call requests is not selected solely based upon the proximity of the callee to the remote node, and wherein* the remote node *is* operable to initiate phone calls to callees based on the second group of *the generated* call request*s*.

4. The method of claim 1, *wherein the* calling area is an emergency area, and the emergency area is automatically updated periodically to a new emergency area.

6. The method of claim 5, wherein[.] the new emergency area is used to select a new subset of phone numbers from the database, each of the new subset of phone numbers having information representing a geographic location within the new emergency area in the at least one data field associated with the phone number.

*9. A method of automatically placing phone calls to callees in a calling area, the method comprising the steps of:*
    *a. providing a database comprising more than one data field, including at least one data field containing a potential callee's phone number and at least one data field containing information representing a geographic location of the potential callee;*
    *b. providing the potential callee's phone number and information representing a geographic location of the potential callee for a plurality of potential callees;*
    *c. providing a message to be transmitted to the callees;*
    *d. defining a geographic area to receive the message,*
    *e. identifying the potential callees' phone numbers falling within the geographic area to receive the message by using the information representing a geographic location of the potential callee and generating a call request for each of the potential callee's phone number identified;*
    *f. creating at least one subset of generated call requests to send to at least one remote node, wherein the at least one subset of generated call requests is not solely selected based upon a calle's proximity to a remote node, and wherein the at least one subset of generated calls is less than the entirety of the database;*
    *g. sending each of the at least one subsets of the generated call requests to a separate remote node; and*
    *h. initiating calls to callees identified in the at least one subset of generated call requests from the remote node.*

*10. The method of claim 9, wherein the remainder of the generated call requests are initiated from a node generating the call requests.*

*11. The method of claim 10, wherein the generated call request includes only the potential callees' phone numbers and the message.*

\* \* \* \* \*